Oct. 14, 1924.
H. ARNOLDI
SHOCK ABSORBER
Filed Nov. 17, 1919
1,511,436
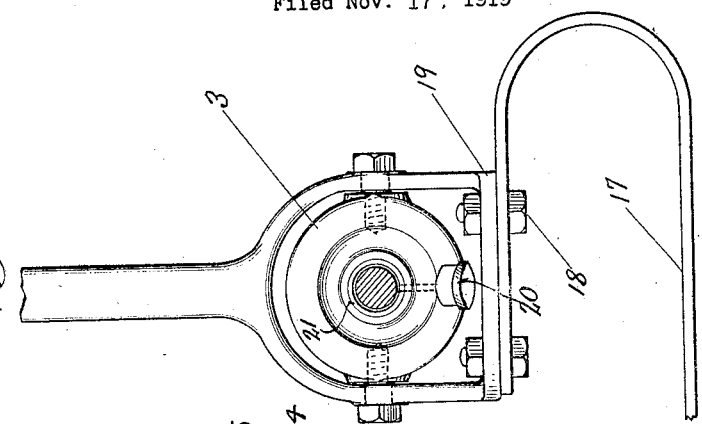
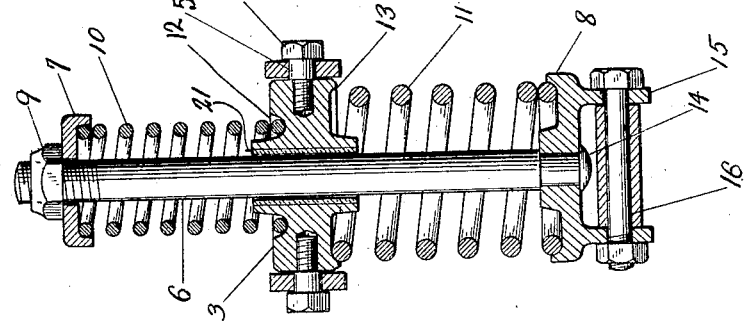
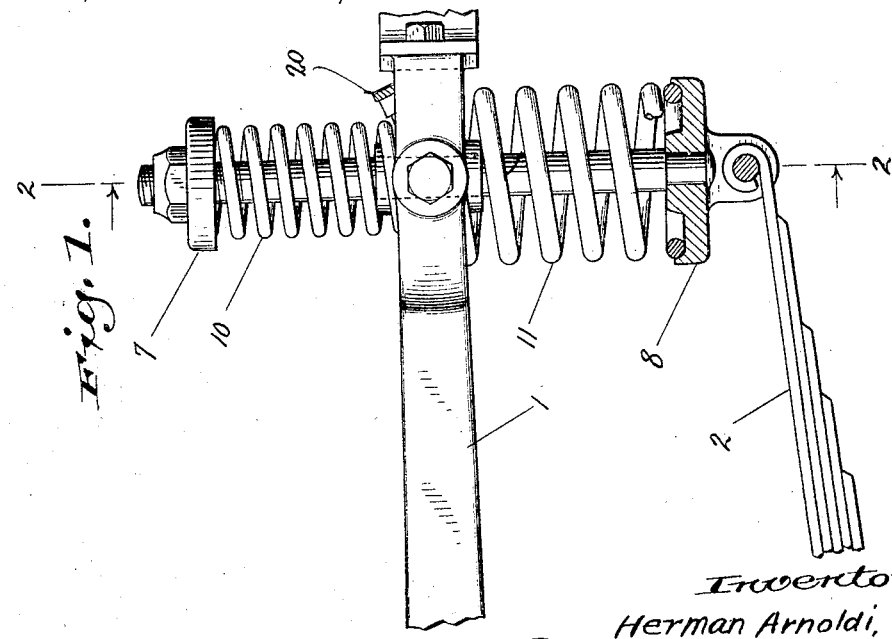
Inventor
Herman Arnoldi,
Erwin, Wheeler & Woolard
Attorneys Patented Oct. 14, 1924.

1,511,436

UNITED STATES PATENT OFFICE.

HERMAN ARNOLDI, OF MILWAUKEE, WISCONSIN; CLEMENCE J. BILLERBECK ADMINISTRATOR OF SAID HERMAN ARNOLDI, DECEASED.

SHOCK ABSORBER.

Application filed November 17, 1919. Serial No. 338,562.

*To all whom it may concern:*

Be it known that I, HERMAN ARNOLDI, a citizen of Germany, residing at Milwaukee, county of Milwaukee, and State of Wisconsin, have invented new and useful Improvements in Shock Absorbers, of which the following is a specification.

My invention relates to shock absorbers for application between the main springs of a vehicle and the frame of the body portion.

One of the objects of my invention is to provide a shock absorber of simple construction which may be readily applied to vehicles and which will not require elaborate machine operations to produce the various parts thereof.

A further object of my invention is to provide a shock absorber which will take up the shocks incident to the traveling over rough ground and will not allow such shocks to be conveyed thru the truck to the body portion of the vehicle.

A further object is to provide a shock absorber which is interposed between the body of the vehicle and the main springs so that the shocks normally transmitted thru the main springs will be absorbed in this device before they reach the body of the vehicle.

A further object of my invention is to provide a device which will act as a shock absorber and also will prevent excessive rebound of the vehicle body after compression of the main springs.

A further object of my invention is to provide a shock absorber in which all of the parts are free to adjust themselves to the varying positions assumed by the body of the vehicle in reference to the truck without binding and without requiring an elaborate construction.

A further object is to provide a shock absorber of a minimum number of parts.

Other objects will appear.

An embodiment of the invention is shown in the accompanying drawings in which—

Fig. 1 is a side elevation of a shock absorber in position.

Fig. 2 is a section on the line 2—2 of Fig. 1.

Fig. 3 is a plan view of Fig. 1 with the upper portion of the mechanism removed and the stem shown in section.

The shock absorber is adapted to be placed between the frame 1 of the body portion of the vehicle and the main spring 2 thereof and connected to these parts in such a manner that relative movement is permitted. The shock absorber comprises a member 3 which is pivotally mounted upon body frame 1 by means of shouldered bolts 4 which pass thru and pivot in the frame 1 and are screwed into the member 3 until the shoulder portion wedges against such member 3. The enlarged portion 5 of these bolts is slightly wider than the portion of the frame thru which it passes so that the member 3 is free to pivot in the frame member 1. A rod 6 is arranged to reciprocate thru a central opening in the pivoted member 3 and carries at its upper and lower ends cup shaped flanged caps 7 and 8 respectively. The cap 7 is held in place by a nut 9 which also serves as an adjusting means for varying the compression of the springs 10 and 11 forming a part of the shock absorber.

The upper spring 10 is the rebound spring and is lighter than the lower spring 11. This spring 10 is carried between the cup shaped member 7 and the member 3, being seated within the flanged portion of the member 7 and within a groove 12 formed in the member 3. The lower spring 11 is carried within the flanged portion of the member 8 and also within the flanged portion 13 of the member 3 which in effect, forms two grooves for this spring to fit into at its upper and lower ends.

These springs are both compression springs and are held under slight compression in their normal state. In order to transmit the thrust of the spring 10 to the cup shaped member 8 the rod 6 is riveted at 14 to the member 8 and serves to transmit the force of the spring 10 to such member.

The member 8 has ears 15 formed thereon thru which passes a bolt 16. This bolt 16 serves to pivotally connect the spring 2 with member 8 thereby allowing the member 8 to adjust itself to meet varying conditions.

Figures 1 and 3 show a spring bumper 17 bolted at 18 to the outer portion 19 of the frame 1, and a grease cup 20 provided to lubricate the pin 6 where it passes thru the bronze bushing 21 of the member 3.

It will be seen that the pivots 16 and 4 have their axes parallel and allow the rod 6 to assume various angular positions without binding at any point. The springs 10 and 11 resiliently position the rod with respect to the pivotally mounted member 3 and allow such rod to adjust itself thru the member 3 to meet the conditions required. It will thus be seen that when a sudden shock would normally be transmitted from the spring 2 to the body 1, such shock is absorbed or cushioned by the spring 11. Upon rebound the spring 10 effectively serves to reduce such rebound by applying a gradually increasing opposing force to the upward motion of the member 3 relative to the rod 6. My shock absorber therefore, serves the purpose of absorbing shocks that would otherwise be transmitted to the frame of the vehicle and also of checking excessive rebound of the frame. The springs 10 and 11 have periods of vibration which are different from each other and from that of the spring 2. Therefore, sustained or continued vibration is prevented as there is no one common period for the entire spring structure.

Obviously other structures may be devised which will embody the invention herein set forth.

I claim—

1. The combination with the frame and main spring of a vehicle, of a cushioning device comprising a plurality of helically coiled springs, an interposed seating member for the opposed ends of the helically coiled springs, said member having diametrically opposite pivotal connections with said frame, and a rod having a seating device for the outer end of each of said second mentioned springs, said rod being pivotally connected with the main spring and having sliding bearing connection with said interposed seating member.

2. The combination with the main spring of a vehicle, of a rod pivotally connected therewith, a pair of helically coiled springs on said rod, an interposed seating for the opposing ends of said coiled springs, having a central bearing for the rod, adapted to permit sliding movement of the rod therethrough, the ends of the rod also having seatings for the outer ends of the respective coiled springs, and a pivotal connection between the interposed seating and the vehicle frame.

3. A shock absorbing attachment for vehicles comprising the combination of a rod having a pair of helically coiled springs thereon, seating members for said springs fixed to the ends of the rod, a seating member through which the rod passes, interposed between the adjacent ends of said coiled springs and adapted for sliding movement on said rod, and means for pivotally connecting the interposed seating member and one of the end seating members with relatively movable members of a vehicle chassis with the pivotal axes parallel and intersecting the axial line of the rod.

4. A shock absorber comprising a fork-shaped member adapted to be attached to a portion of the chassis of an automobile, an apertured member pivotally mounted within said stationary fork-shaped member, a rod provided with a sliding bearing in the apertured member, a spring positioned upon each side of said apertured member and surrounding said rod, means for operatively connecting said rod with the outer ends of the springs, and means for connecting the lower end of said rod with the eye of an automobile spring.

5. A shock absorber for an automobile comprising a stationary fork-shaped member adapted to be secured to a portion of the chassis of the automobile, a centrally apertured member pivotally mounted within the fork and provided with an elongated hub surrounding the aperture and intersected by the pivotal axis about which said member is rotatable, a rod slidably journaled in said hub and extending upon opposite sides of said member, a pair of springs of different characteristics positioned upon opposite sides of said apertured member and operatively connected at their outer ends with said rod, one of said springs seating about said elongated hub in the apertured member, an outwardly turned flange formed integrally with said apertured member and surrounding the inner end of the other spring, and means for connecting the eye of a main spring of the automobile with one end of said rod.

6. In combination, a bearing member, a relatively heavy spring above said member, a relatively light spring below said member, means for engaging said springs at their ends and compressing both against said member, means for attaching the free end of a vehicle spring to said spring engaging means, a bracket adapted for connection to the running gear of the vehicle, and means for pivotally mounting said bearing member on the bracket.

In testimony whereof I affix my signature in the presence of two witnesses.

HERMAN ARNOLDI.

Witnesses:
J. Moss,
A. R. Woolfolk, Jr.